United States Patent [19]

Zmokly et al.

[11] 4,317,990

[45] Mar. 2, 1982

[54] LABEL FOR THE IDENTIFICATION OF ANIMALS OR OBJECTS

[76] Inventors: Tadeusz Zmokly, 151 Rue Victor Hugo, 93150 Le Blanc-Mesnil; Alain Porcher, 107 Rue Pelleport, 75020 Paris, both of France

[21] Appl. No.: 83,941

[22] Filed: Oct. 11, 1979

[30] Foreign Application Priority Data

Oct. 12, 1978 [FR] France ................................ 78 29111

[51] Int. Cl.³ ...................... G06K 19/06; A01K 1/10; G06K 19/00
[52] U.S. Cl. ................................ 235/494; 119/51 R; 235/487
[58] Field of Search ............... 235/487, 489, 493, 494, 235/487, 449; 119/51 R; 128/2 R; 340/220

[56] References Cited

U.S. PATENT DOCUMENTS

| | | | |
|---|---|---|---|
| 2,265,440 | 12/1941 | Maul | 235/494 |
| 3,325,632 | 6/1967 | Lilly et al. | 235/493 |
| 3,350,946 | 11/1967 | Isreeli | 235/487 |
| 3,654,435 | 4/1972 | Vaccaro | 235/494 |
| 3,788,278 | 1/1974 | Propst et al. | 119/51 R |

*Primary Examiner*—Robert M. Kilgore
*Attorney, Agent, or Firm*—Wenderoth, Lind & Ponack

[57] ABSTRACT

A label is attached to an animal or object and is provided with directly intelligible identification information. At least one second identification information which is in a coded form and consequently unintelligible is placed on the label. If required, the unintelligible information may be decoded so as to permit a comparison with the intelligible information carried by the label. Equipment is provided for producing the coded identification information on the label and for decoding the coded identification information by means of a decoding device.

8 Claims, 19 Drawing Figures

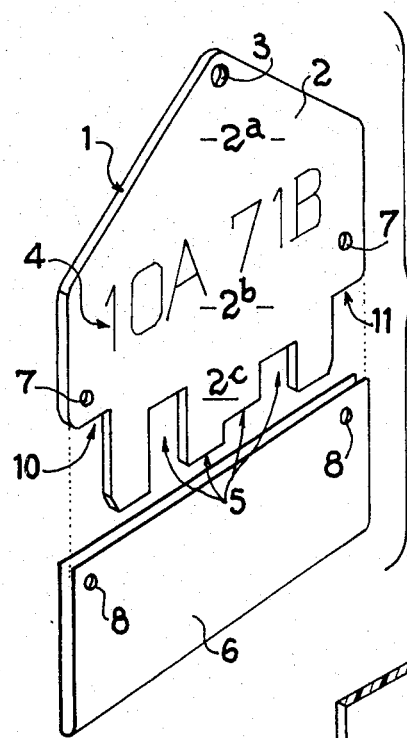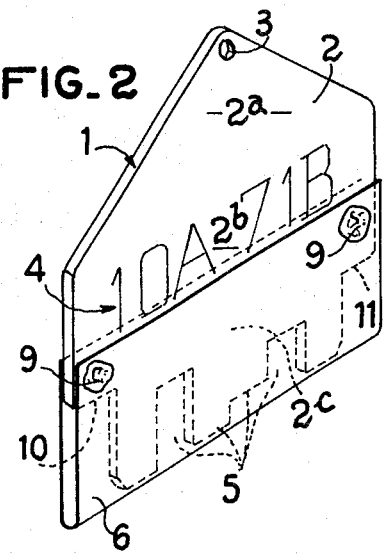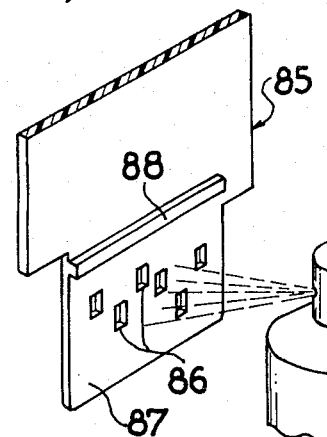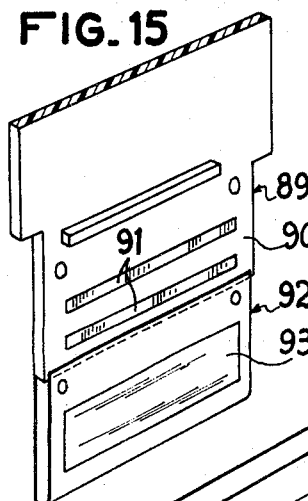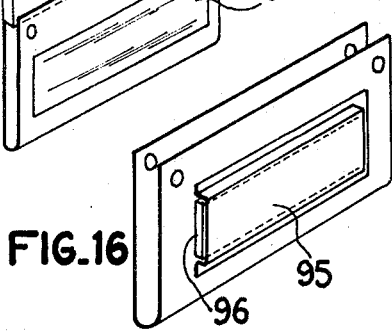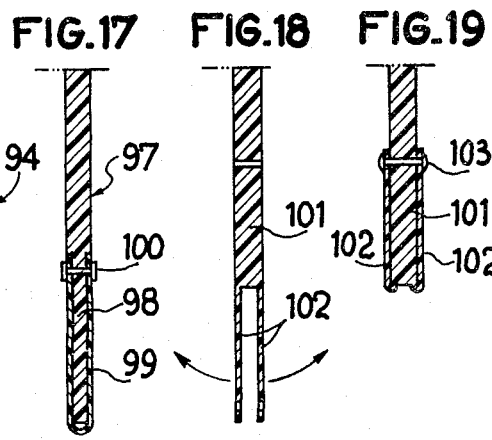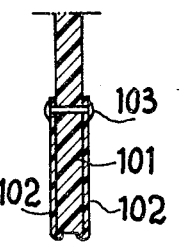

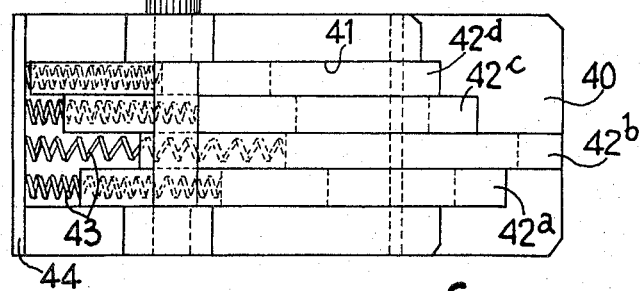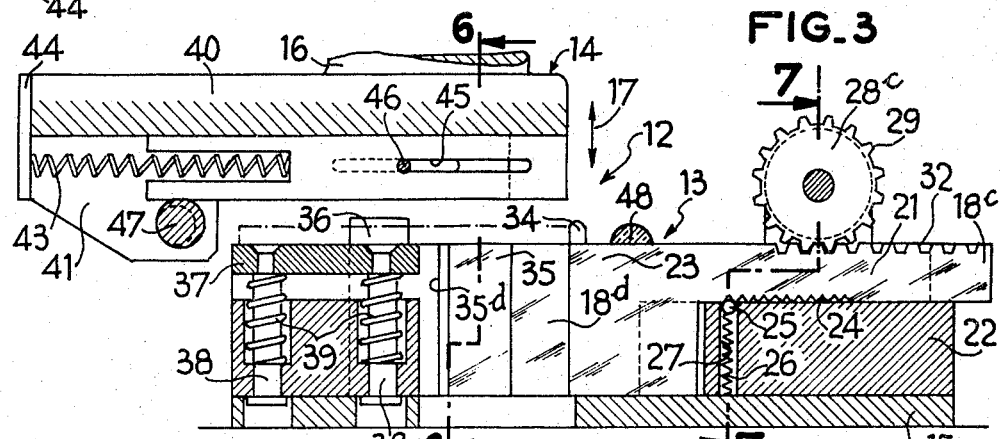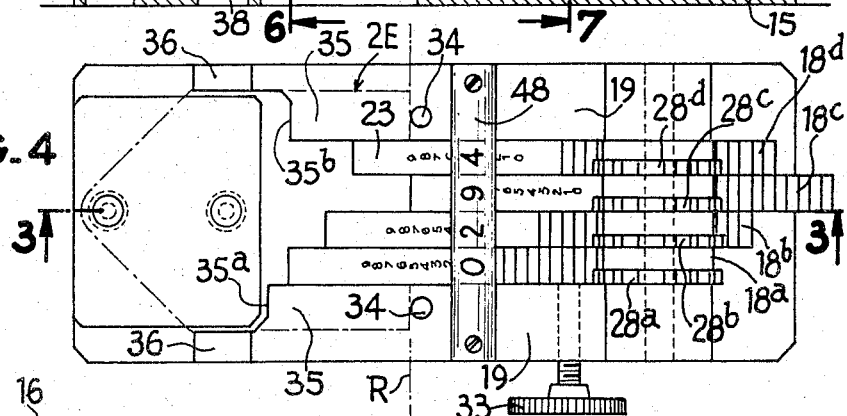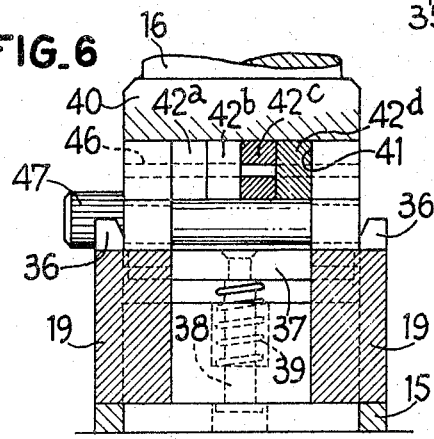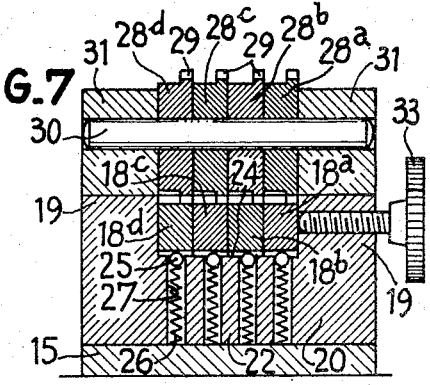

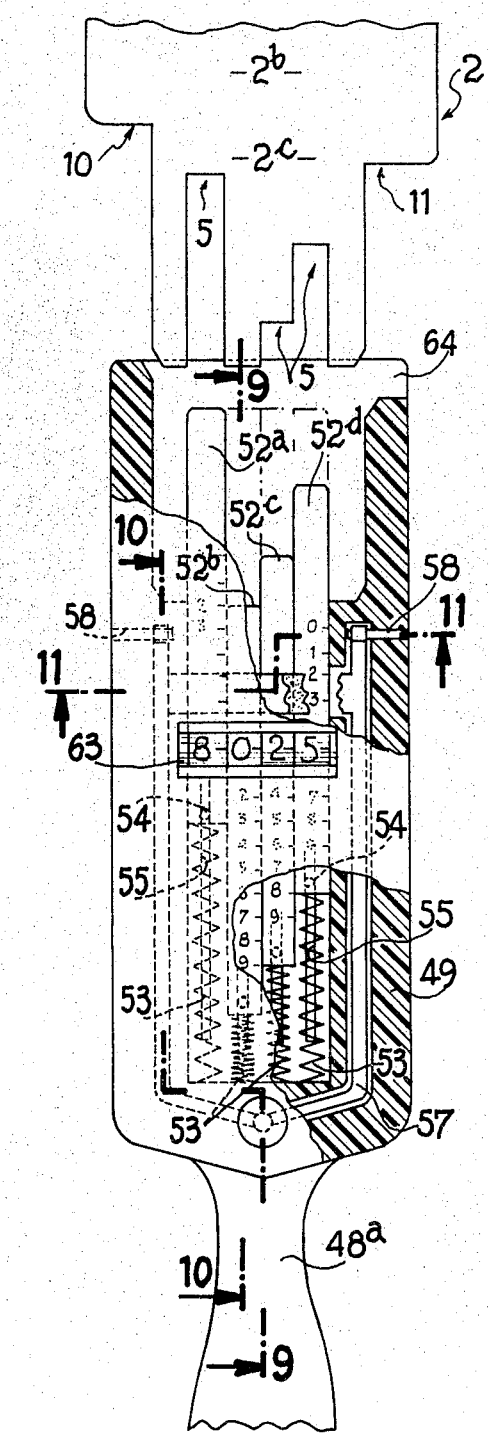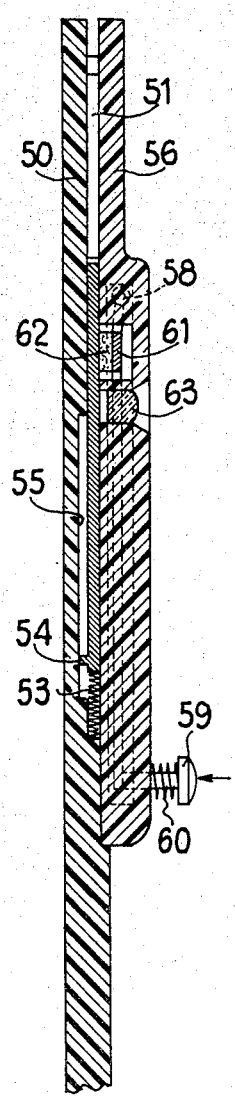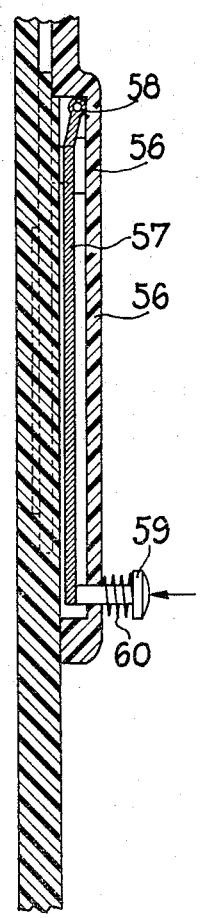

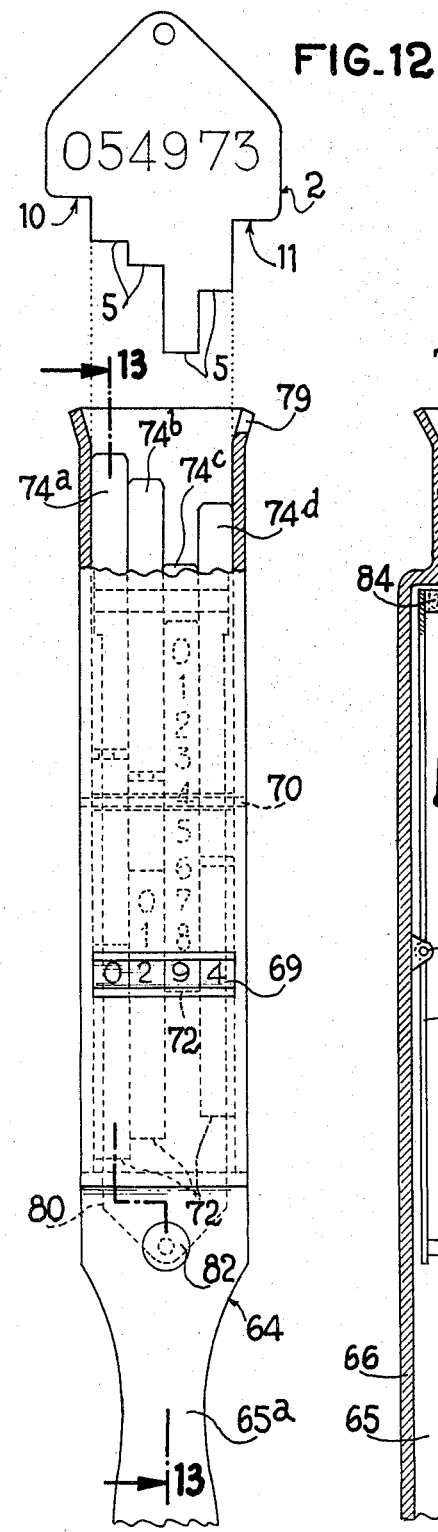
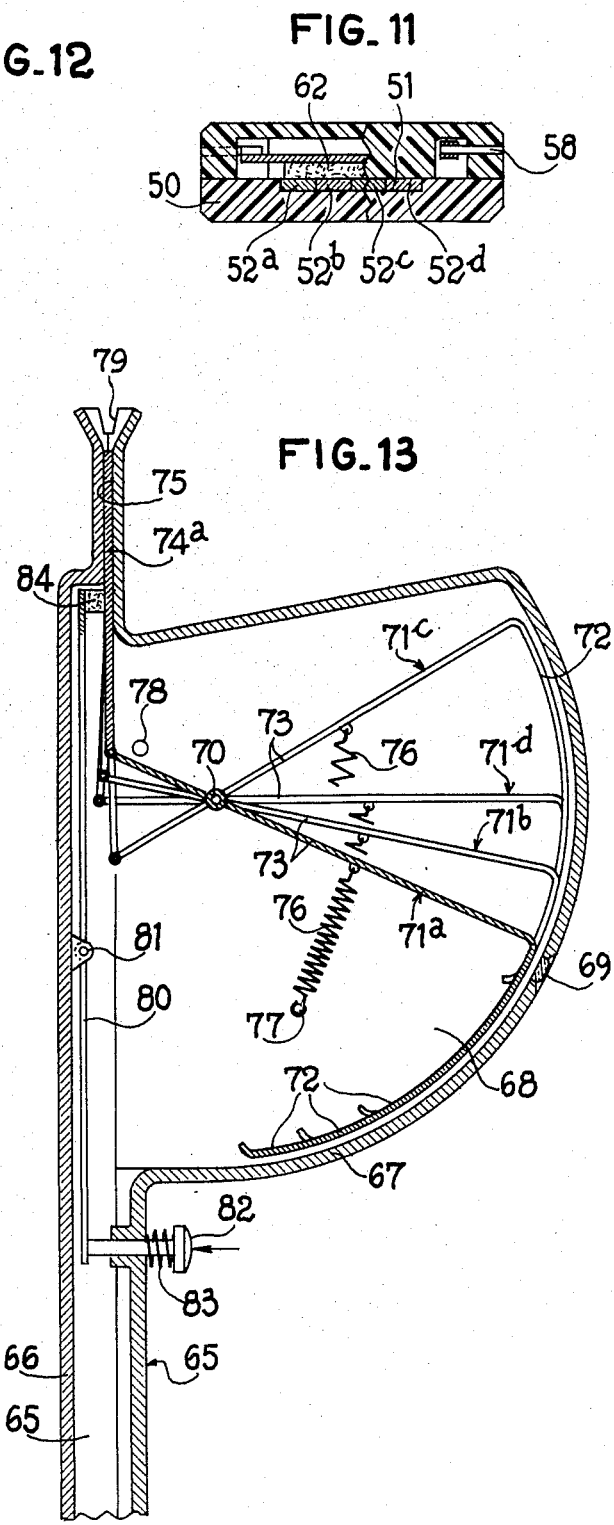

LABEL FOR THE IDENTIFICATION OF ANIMALS OR OBJECTS

BACKGROUND OF THE INVENTION

The present invention relates to a manner for the identification of animals or objects by means of labels or tabs which are attached to the latter in an inviolable manner and are provided with directly intelligible means of identification. More precisely, the invention relates to label or tab for the identification of bred animals which label or tag may be attached, for example, to the ear of the animal to be identified. The label or tag may have a plate which carries information relating to the proprietor or to the breeder of the animal.

It is known that the breeding of animals for subsequent slaughter is controlled by severe regulations which apply throughout the life of the animal and it is therefore necessary to be capable of identifying the latter with no risk of error or fraud.

At the present time, the most widely used manner of identification comprises attaching, by a perforation of the ear of the animal, a small plate also termed "ear button" which carries a number or some other identification means which is directly intelligible both by the official veterinary services and by the persons involved during the life of the animal, such as the breeder, the personnel of a slaughter house or other persons. Such an identification system may result in risk of error, and ill-intentioned persons may possibly modify the identification information placed on the label.

SUMMARY OF THE INVENTION

An object of the invention is to provide a label or tag for the identification of animals or objects of the aforementioned general type which permits reducing to a minimum the risk of error and/or fraud of the identification.

For this purpose, the invention provides such a label having placed thereon at least one second identification information in coded and consequently unintelligible from which, if required, may be decoded so as to permit comparison with the intelligible information carried by the label.

Owing to a predetermined relationship which must exist between the intelligible information and the unintelligible information, the animal or the object is provided with a double identification which of course lessens the risk of errors. Moreover, as the unintelligible information cannot be detected by unauthorized persons, the risk of fraud is considerably reduced.

BRIEF DESCRIPTION OF THE DRAWINGS

Further features and advantages of the invention will be apparent from the ensuing description with reference to the accompanying drawings which are given merely by way of example and in which:

FIG. 1 is an exploded perspective view of an ear button for the identification of animals according to the invention;

FIG. 2 is a perspective view of such an ear button in the assembled state;

FIG. 3 is a diagrammatic sectional and elevational view of a press for coding ear buttons of the type shown in FIGS. 1 and 2 according to the invention;

FIG. 4 is a plan view of the table of the press shown in FIG. 3;

FIG. 5 is a horizontal bottom view of the part of the press shown in FIG. 3 which forms the punch;

FIGS. 6 and 7 are cross-sectional views of the coding press respectively taken along lines 6—6 and 7—7 of FIG. 3;

FIG. 8 is a diagrammatic elevational view of a tool for decoding ear buttons according to the invention;

FIGS. 9, 10 and 11 are sectional views taken along lines 9—9, 10—10, 11—11 of FIG. 8;

FIG. 12 is a diagrammatic elevational view of a tool for decoding ear buttons arranged in accordance with a second embodiment;

FIG. 13 is a sectional view taken along line 13—13 of FIG. 12;

FIG. 14 is a perspective view of an ear button arranged in accordance with a modification of the invention;

FIG. 15 is a perspective view of another modification of the ear button;

FIG. 16 is a perspective view of a cover for protecting the code part of an ear button;

FIG. 17 is a sectional view of an ear button, and of the cover therefor, according to a modification;

FIG. 18 is a partial sectional view of another modification of an ear button in which the protecting means are integral with the body of the button; and FIG. 19 is a sectional view of the ear button of FIG. 18, the protecting means being shown to be folded onto the code part of the button.

DETAILED DESCRIPTION OF THE INVENTION

The label or tab 1 shown in FIGS. 1 and 2 is more particularly intended for the identification of bred animals, in which case it is more usually designated "ear button." However, the invention is not intended to be limited to this particular application and labels of the illustrated type may be attached to objects or articles of any type for the sure identification thereof with no risk of fraud.

It can be seen that ear button 1 comprises a plate 2, preferably made from a plastics material, and divided essentially into three portions 2a, 2b and 2c. The first portion 2a comprises an aperture 3 which is adapted to receive attaching means, such as a rivet, a cord or like attaching means for attaching the button to the ear of an animal for example. Preferably, there is employed as attaching means an inviolable rivet, that is to say the button can only be detached from the ear of the animal by the destruction of the plate 2.

The intermediate portion 2b is adapted to receive an information 4 which identifies the animal, or more generally the object, to which the plate 2 is attached. It can be seen that this information is intelligible and constituted in the presently-described embodiment by numbers and letters to identify the breeder of the animal in question.

The plate 2 also has a third portion 2c with which there is associated a second information which is unintelligible and coded. In the presently-described embodiment, this information is embodied by notches 5 of different depths cut in the corresponding edge of the plate 2. It here concerns a numerical code and each notch 5 may represent a number between 0 and 9, the edge of the portion 2c constituting the 0 reference level of the coded information. By way of example, this information comprises four numbers, but it will be understood that in practice there may be provided a much larger number of notches so as to constitute codes consisting of a larger number of elements. Note also that the code does not need to be solely numerical and the depth of the notches may represent letters or other like elements of information.

The ear button 1 also comprises a protecting cover 6 formed by a folded sheet, made for example from plastics material and adapted to cover both sides of the code portion 2c of the plate. Preferably, the latter has two spaced-apart apertures 7 which coincide with apertures 8 provided in the corners of the cover 6 so as to fix the cover to the plate 2 by means of fixing elements such as for example lead seals 9 (FIG. 2). The seals are adapted to eliminate any possibility of an unauthorized or fraudulent disassembly for modification of the code formed on the plate 2. The cover 6 consequently has a double function, namely to protect the notches 5 against a soiling thereof and to eliminate risk of fraud.

At each end of the coding portion 2c, the plate has cut-away portions 10 and 11 which permit locating the orientation thereof when decoding, as will be understood hereinafter in the course of the description with reference to FIGS. 8 to 13.

In order to place the coded information on the plate of FIGS. 1 and 2, there may be employed any suitable means and in particular that shown by way of example in FIGS. 3 to 7.

Such means includes a blanking press 12 (FIG. 3) comprising a die 13 and a punch 14. The die is placed on a fixed base 15 and the punch 14 is mounted on a mount 16 which is capable of undergoing an up-and-down movement as shown by the arrow 17. The press 12 has a blanking profile which is variable so that it is possible to cut out from blanks 2E (FIG. 4) labels or tabs having a predetermined code which may vary from one label to another. For this purpose, the die comprises a series of juxtaposed slides 18a to 18d which are mounted on the base 15 in such manner as to be horizontally movable. The slides 18a to 18d are disposed between lateral sides 19 of the body 20 of the die, each one thereof having approximately the shape of an L. Their rear part 21 is carried by a centre part 22 of the body 20 formed at the rear of the die 13, whereas the front part 23, which extends throughout the height of the sides 19 of the body 20, bears directly against the base 15.

Each of the slides may be placed selectively in ten positions determined by the teeth of a series 24 of teeth provided in the lower face of the rear part 21 of each slide, the series of teeth 24 cooperating with a ball 25 which is biased by a spring 26 and is placed in an aperture 27 formed in the centre part 22 of the body 20 (see in particular FIG. 7).

In order to be able to bring each slide to the required position thereof, there is provided a series of drive rollers 28a to 28d each of which is provided with peripheral teeth 29 and is rotatively mounted on a common shaft 30. The latter is engaged in bearings 31 provided on the sides 19 of the body 20 of the die. The teeth 29 of each roller cooperate with teeth 32 in the form of a rack formed in the upper face of the associated slide. It will be understood that by manually rotating the rollers 28a to 28d, it is possible, by means of the teeth 29 and the teeth 32, to bring the considered side to one of the positions that it may occupy in the body 20, each position being determined by the associated ball 25 which penetrates between adjacent teeth of the series of eeth 24. In order to ensure that, in the course of the cutting operation the slides remain stationary, there is also provided a lock screw 33 which is scrwed into one of the slides 19 of the body 20, the end of this screw being capable of contacting the slide 18a which is immediately adajcent thereto so that all the slides may be clamped against each other and against the opposite side 19 of the die 13.

Two locating pins 34 are respectively fixed in the sides 19, these pins being in alignment therewith transversely of the die 13 and defining in this way a reference position for the coding indicated by the dotted line R in FIG. 4. With the blank 2E bearing against the pins 34 when it is placed in position in the die 13, the corresponding edge of this blank constitutes a reference level from which the depths of the notches to be cut in the blank are determined so as to form the desired code in this blank. In the presently-described embodiment, the reference line corresponds to the number 9 and this level is obtained by fully withdrawing the corresponding slide in the die, as shown by the slide 18c.

The slides 19 of the body 20 are extended forwardly beyond the reference line R by lateral cutting portions 35 which are adapted to form the cut-away portions 10 and 11 in the label (see FIG. 1). The front edges 35a and 35b of these cutting portions 35 are not in transverse alignment so as to obtain different depths of the cut-away portions 10 and 11.

For the purpose of correctly locating the blank 2E in the die, there are also provided at the front end of the sides 19 lateral locating pins 36 which are spaced apart a distance corresponding to the width of the blank 2E.

The die 13 also comprises a support plate 37 which is vertically movably mounted on pins 38 which are fixed in the base 15 and are surrounded by springs 39 for biasing the plate 37 upwardly.

The punch 14 comprises a block 40 which is fixed to the driving means 16 and has in its lower face a longitudinal groove 41 in which are disposed strips 42a to 42d which respectively cooperate with the slides 18a to 18d. Each strip 42a to 42d is biased toward the corresponding slide by a spring 43 which bears against a plate 44 mounted on the end of the block 40 of the punch 14. Further, each strip has a longitudinal recess 45 whose length corresponds to the maximum travel of each strip and which has extending therethrough a common pin 46 which is fixed transversely in the block 40. Further provided is an eccentric 47 whereby it is possible to immobilize the strips 42a to 42d after the whole of the press has been set.

This setting is carried out by placing the punch 14 in its lowermost position with all the slides 18a to 18d urged back so that their front ends are in alignment with the reference line R. It will be understood that the lock screw 33 and the eccentric 47 are loosened. It is then possible to set the code to be cut into the blank 2E by acting on the rollers 28a to 28d so that the slides move to the desired positions while they urge back the respective strips 42a to 42d which are in alignment therewith. The code set in this way may be read through a magnifying glass 48 which is mounted to extend transversely over the slides 18a to 18d.

When this setting has been achieved, the locking screw 33 and the eccentric 47 are tightened and the punch 14 is made to rise so as to enable the blank 2E to be placed in position. In order to cut the latter, it is sufficient to lower the punch 14 with a predetermined force to cut out or notch the desired code in the blank.

It will be understood that the code notched in the blank may be more complex than that which is possible to obtain with the coding device just described. For this purpose, it is sufficient to provide a larger number of slides and strips and/or a larger number of the positions of the slides.

FIGS. 8 to 11 show a first embodiment of a decoding device which is of utility for carrying out the method according to the invention.

This decoding device is in the form of a tool having an elongated body 49 provided with a handle 48a.

The body 49 comprises a first plate 50 or base plate in which there is formed a groove 51 which extends substantially throughout its length. Disposed in this groove are display strips 52a to 52d each of which carries the marking of numbers from 0 to 9 in the direction of the length. The strips are juxtaposed in the groove 51 and are capable of longitudinally sliding therein in opposition to the action of associated springs 53. Each strip 52a to 52d is guided in its longitudinal movement owing to the action of a pin 54 which projects from its rear face into a groove 55 provided over a certain length in the bottom of the groove 51 for each strip 52a to 52d. The groove 51 is covered with a cover 56 in which is disposed a blocking means 57. The latter is formed by a yoke whose branches are pivotally mounted on pins 58 at the ends of the branches so that the yoke is pivotable about an axis which is perpendicular to the general direction of the longitudinal movement of the strips 52a to 52d. The blocking means 57 may be actuated by a shifting knob 59 which extends through the cover 56 in the lower centre part thereof and is biased outwardly by a return spring 60. The branches of the yoke 57 forming the blocking means are braced by a transverse bar 61 which comprises, on the side thereof facing the strips 52a to 52d, an anti-slip pad 62. The cover is provided with a magnifying glass 63 whereby it is possible to observe the numbers marked on the strips 5a to 52d.

FIG. 8 shows that one of the sides of the groove 51 is not extended to the end edge of the body 50, but that there is provided in this region an opening 64 which renders the entrance of the decoding device asymmetrical. Consequently, the reading of the plates 2 can only be carried out in a single position since the opening 64 cooperates with the cut-away portion 11 which is shallower than the cut-away portion 10 and is provided on all the plates.

When a label 2 is inserted in the decoding device, the strips 52a to 52d are urged back in opposition to the action of the springs 53 to an extent which depends on the depth of the corresponding notches 5 provided in this label. By depressing the knob 59, the strips 52a, to 52d can be blocked in position and the label can be withdrawn without losing the display of the code behind the magnifying glass 63. When the code has been read off from the device, the release of the knob 59 causes all the strips to return to the initial position for reading another label.

In the decoding device just described, each element of information (in the present case each number) marked on a given strip occupies a minimum zone required to permit a correct reading through the magnifying glass 63. This imposes a limitation on the density or on the amount of information which may be displayed selectively owing to the depth of the notches 5 of the label 1. In other words, in order to obtain a correct selectivity of the reading, a minimum difference of depth (equal to the length of a zone on the strip ) is required between the depth effectively chosen for a notch and the depth which would have been chosen if it was required to diaplay either of the information elements adjacent to the element corresponding to the chosen depth.

For example, if there must be displayed by each strip 52a to 52d the numbers 0 to 9 and 2 mm is chosen as the height of the numbers (which is required to ensure a correct reading), it must be arranged that a notch on the label must have a depth of 20 mm. Thus if it is desired to obtain the possibility of displaying by means of each strip a number od elements exceeding 10, the dimension of the label must be increased correspondingly, which is hardly practical.

FIGS. 12 and 13 show a decoding device whereby it is possible, for a given dimension of the label, to obtain increased displaying possibilities of the strips. In other words, in order to be able to selectively display ten elements of information, the maximum possible depth of a notch of the label is distinctly less (for example 10 mm).

The decoding device of FIGS. 12 and 13 comprises a case 65 provided with a handle 65a. This case comprises a rear wall 66 and a front wall 67 which is shaped in such manner as to define in the decoding device a cavity 68. A reading magnifying glass 69 is inserted in the front wall 67, namely in the part which defines a cavity 68. Extending through the latter is a pivot pin 70 on which are mounted display arms 71a to 71d, the number of which corresponds to the number of notches 5 of a label to be decoded.

Each arm 71a to 71d is cranked and includes a diaplay branch 72 which is curved in such manner as to conform to the curvature of the wall 67, and a rectilinear pivotal branch 73 which is pivotally mounted on the pin 70 near to the end thereof opposed to the display branch 72. The display branch 72 comprises a series of elements of information which may appear selectively behind the magnifying glass 69 for the purpose of being read.

Each arm 71a to 71d is pivotally connected to a respective strip 74a to 74d wich is slidably mounted in a passage 75 formed between the front and rear walls 66 and 67 of the device. The strips 74a to 74d are juxtaposed in the passage 75 and are actuatable by means of a label 2 which is inserted in the passage from above the decoding device.

Each arm 71a to 71d is provided with a return spring 76 which is hooked to a pin 77 fixed in the decoding device in a transverse position in the cavity 68. Another pin 78 extends through the cavity for acting as an abutment for the arms which are urged thereagainst by the action of the return springs 76.

A notch 79 is formed laterally in the entrance of the passage 75 for cooperation with the cut-away portion 11 of the label 2 for the purpose of ensuring the correct positioning of the label in the decoding device.

A pivotal plate 80 forming a lever is mounted against the rear wall 66 by means of a pivot 81. This plate is connected to a shifting knob 82 which is biased by a spring 83 and which may be acted upon while holding the handle 65a of the decoding device. At its opposite end, the pivotal plate 80 is provided with a blocking pad 84 adapted to be urged against the strips 74a to 74d when the button 82 is depressed after insertion of a label in the decoding device.

Owing to the fact that the pivot pin 70 is located near to the end of the arms 71a to 71d which is adjacent the respective strips 74a to 74d, the displacement of the display branches 72 corresponds to the product of the displacement of the corresponding strip multiplied by a factor resulting from the ratio between the portions of the pivot branches 73 located on each side of the pivot pin. Consequently, there may be provided for each element of information marked on the display branch a zone whose length may be much greater than the unitary displacement of the strips 71a to 74d.

Whereas in the foregoing description the labels have notches of different depths, so as to represent the coded information, FIG. 14 shows a label 85 provided with perforations 86 the location of which on a coded zone 87 represents the information carried by this label. An insertion abutment 88 projects from the surface of the label. Further, FIG. 14 shows a sprayer P for a protecting product whereby it is possible to provide the coding zone 87 with a coating which prevents a soiling of the perforations provided in this zone. The protecting product may be a suitable plastics material or some other material.

FIG. 15 shows another modification of a label 89 comprising a coded zone 90 on which are placed two tracks 91 of magnetic material which are capable of being magnetized by a magnetic recording of the coded information. FIG. 15 also shows a cover 92 which may be attached to the label in the same way as the cover 6 of FIG. 1. It can be seen that the cover 92 has a pocket 93 in which may be inserted information supports such as cards, sheets of paper or other supports provided with more elaborate information relating to the animal or object to be identified. The pocket 93 may be made from a transparent material so that the information support inserted therein may be seen directly.

FIG. 16 shows another modification of a cover 94 which may be employed with the labels according to the invention. In this case, the cover carries a pocket 95 of such volume than an object 96 may be inserted thereon. It may concern for example a high-frequency transmitter or other device for transmitting information relating to the behaviour of the animal to a remote receiver for example.

FIG. 17 shows another modification of the label formed by a plate 97 whose coding zone 98 is thinner than the rest of the plate, this difference of thickness enabling this label to be associated with a cover 99 which does not project from the surface of the label (as in the previously described embodiments) but which is flush with the surfaces of the plate. Rivets 100 or other like fixing means render this cover 99 rigid with the plate.

FIGS. 18 and 19 show yet another modification of the label whose plate 101 has two lip portions 102 which are integral therewith and extend the two faces of the plate. These lip portions 102 are adapted to be folded about their zone of connection with the plate and applied against the latter so as to constitute a cover. Here again, rivets 103 or other like fixing means maintain the lip portions 102 in their protecting position.

Having now described out invention what we claim as new and desire to secure by Letters Patent is:

1. A label for the identification of an animal or an object, said label comprising:
    a plate;
    means for attaching said plate to an animal or object to be identified;
    said plate including a first zone provided with directly intelligible clear information and a coding second zone provided with unintelligible identification information in coded form; and
    a cover covering opposite sides of said coding second zone, said cover comprising two spaced apart lip portions of said plate, said lip portions extending from an edge of said plate adjacent said coding second zone, said lip portions being folded over against said opposite sides of said coding second zone, and means for fixing the thus folded over said lip portions to said plate.

2. A label as claimed in claim 1, further comprising a pocket fixed to said cover.

3. A label for the identification of an animal or an object, said label comprising:
    a plate;
    means for attaching said plate to an animal or object to be identified;
    said plate including a first zone provided with directly intelligible clear information and a coding second zone provided with unintelligible identification information in coded form;
    a cover covering opposite sides of said coding second zone; and
    a pocket fixed to said cover.

4. A label for the identification of an animal or an object, said label comprising:
    a plate;
    means for attaching said plate to an animal or object to be identified;
    said plate including a first zone provided with directly intelligible clear information and a coding second zone provided with unintelligible identification information in coded form;
    a cover covering opposite sides of said coding second zone;
    said coding second zone having a thickness less than the thickness of the remainder of said plate; and
    said cover covering said coding second zone in a manner to be flush with said remainder of said plate.

5. A label as claimed in claim 3 or 4, wherein said cover is detachably connected to said plate.

6. A label as claimed in claim 3 or 4, wherein said cover is attached to said plate by means of at least one seal.

7. A label as claimed in claim 1, 3 or 4, further comprising reference means for correctly presenting said label against a decoding device.

8. A label as claimed in claim 7, wherein said reference means comprises cut-away portions of different dimensions formed in two corners of said plate adjacent said coding second zone.

* * * * *